United States Patent
Tamai et al.

(10) Patent No.: US 10,900,764 B2
(45) Date of Patent: Jan. 26, 2021

(54) MEASURING APPARATUS MANAGEMENT SYSTEM AND PROGRAM

(71) Applicant: MITUTOYO CORPORATION, Kanagawa (JP)

(72) Inventors: Toshiyuki Tamai, Kanagawa (JP); Kozaburo Suzuki, Kanagawa (JP)

(73) Assignee: MITUTOYO CORPORATION, Kanagawa (JP)

(*) Notice: Subject to any disclaimer, the term of this patent is extended or adjusted under 35 U.S.C. 154(b) by 229 days.

(21) Appl. No.: 16/027,854

(22) Filed: Jul. 5, 2018

(65) Prior Publication Data
US 2019/0017797 A1    Jan. 17, 2019

(30) Foreign Application Priority Data
Jul. 13, 2017   (JP) .................. 2017-137210

(51) Int. Cl.
  *G01B 5/016* (2006.01)
  *G01B 5/20* (2006.01)
  *G01B 21/04* (2006.01)

(52) U.S. Cl.
  CPC ............. *G01B 5/016* (2013.01); *G01B 5/201* (2013.01); *G01B 21/047* (2013.01)

(58) Field of Classification Search
  CPC ......... G01B 5/016; G01B 5/012; G01B 5/008
  USPC ........ 33/504, 503, 556, 559; 702/34, 94, 95, 702/150
  See application file for complete search history.

(56) References Cited

U.S. PATENT DOCUMENTS

| | | | | |
|---|---|---|---|---|
| 7,392,692 | B2 * | 7/2008 | Noda | G01B 5/008 33/503 |
| 2008/0295571 | A1 * | 12/2008 | Takahama | G01B 21/045 73/1.89 |
| 2010/0286961 | A1 * | 11/2010 | Kojima | G01B 21/042 702/184 |
| 2010/0293800 | A1 * | 11/2010 | Nakayama | G01B 21/047 33/558 |
| 2011/0005095 | A1 * | 1/2011 | Nakayama | G01B 3/008 33/556 |
| 2011/0197665 | A1 | 8/2011 | Sakata et al. | |
| 2013/0054176 | A1 * | 2/2013 | Pedigo | B64F 5/60 702/108 |
| 2013/0090878 | A1 * | 4/2013 | Somerville | G01B 21/042 702/95 |
| 2014/0328359 | A1 * | 11/2014 | Yano | H01S 3/109 372/29.011 |
| 2015/0253125 | A1 * | 9/2015 | Pettersson | G06T 19/006 715/771 |
| 2016/0131470 | A1 * | 5/2016 | Ishikawa | G01B 21/045 33/503 |

(Continued)

FOREIGN PATENT DOCUMENTS

| | | | | |
|---|---|---|---|---|
| CN | 103105186 A | * | 5/2013 | ............. G01B 5/012 |
| JP | 2011-169616 A | | 9/2011 | |

*Primary Examiner* — Christopher W Fulton
(74) *Attorney, Agent, or Firm* — Greenblum & Bernstein, P.L.C.

(57) ABSTRACT

A measuring apparatus management system of the present invention includes an acquirer acquiring condition information indicating a status of a replacement component in each of a plurality of measuring apparatuses, and a predictor predicting a replacement time of the replacement component based on the condition information obtained by the acquirer.

17 Claims, 10 Drawing Sheets

(56) References Cited

U.S. PATENT DOCUMENTS

| | | | |
|---|---|---|---|
| 2016/0258733 A1* | 9/2016 | Shimaoka | G01B 5/20 |
| 2016/0265912 A1* | 9/2016 | Yasuno | G01B 3/30 |
| 2017/0115109 A1* | 4/2017 | Noda | G01B 5/012 |
| 2018/0217040 A1 | 8/2018 | Tsujii et al. | |

* cited by examiner

MEASURING APPARATUS MANAGEMENT SYSTEM AND PROGRAM

CROSS-REFERENCE TO RELATED APPLICATIONS

The present application claims priority under 35 U.S.C. § 119 of Japanese Application No. 2017-137210, filed on Jul. 13, 2017, the disclosure of which is expressly incorporated by reference herein in its entirety.

BACKGROUND OF THE INVENTION

1. Field of the Invention

The present invention relates to a measuring apparatus management system managing/analyzing various recorded data, and particularly relates to a measuring apparatus management system that estimates maintenance and replacement of components for a measuring apparatus and executes a process by analyzing various recorded data.

2. Description of Related Art

Conventionally, a variety of measuring apparatuses have been used for measuring a shape and dimensions of a measured object (measurable object or object to be measured). As such a measuring apparatus, a roundness measuring apparatus and a surface texture measuring apparatus are known, for example. The roundness measuring apparatus and the surface texture measuring apparatus detect vertical movement of a stylus that is generated when a surface of a measured object is traced by the stylus having a sharp tip end and measure unevenness and texture of the measured object surface based on the detected movement. During the measurement, the stylus is displaced while in physical contact with the surface of the measured object, and therefore, the tip end of the stylus is worn out in accordance with a use history. When the stylus is worn out, measurement precision is decreased. When the wear progresses, the measurement precision becomes worse than an acceptable limit, meaning that there is a limit on the life of the stylus, and the stylus must be maintained and replaced at an appropriate time.

In order to promote replacing the stylus at the appropriate time, a measuring apparatus has been proposed in which the measuring apparatus detects a displacement distance of the stylus and provides notification of a replacement time when an accumulated displacement distance exceeds a threshold value (see Japanese Patent Laid-open Publication No. 2011-169616, for example). However, whether the stylus is replaced or not in response to such a notification depends on a determination of a user or a person managing of the measuring apparatus. In addition, when the stylus is about to be replaced, there is also a case where a replacement stylus may not be readily available. In such a case, the measurement precision has to be sacrificed or the measurement has to be abandoned.

SUMMARY OF THE INVENTION

The present invention was conceived in light of the circumstances above, and provides a measuring apparatus management system to allow easy management of the measuring apparatus.

In order to address the above circumstances, the measuring apparatus management system according to the present invention includes an acquirer and a predictor. The acquirer acquires condition information indicating a status of a replacement component in each of a plurality of measuring apparatuses. The predictor predicts a replacement time of the replacement component based on the condition information obtained by the acquirer.

The present invention may further include a notification mechanism notifying a production department of information on a required time and quantity for the replacement component, based on a prediction result from the predictor. Further, based on the prediction result from the predictor and an inventory of the replacement component, the production department may be notified of information related to a production plan for the replacement component. The condition information is preferably not measurement data in the measuring apparatus.

In the present invention, the measuring apparatus is a roundness measuring apparatus for example. In this case, the replacement component may be a stylus. The condition information may be a contact displacement distance accumulating a distance over which the stylus displaces while in contact with a measured object.

A program according to the present invention enables a computer to act as any measuring apparatus management system mentioned above.

BRIEF DESCRIPTION OF THE DRAWINGS

The present invention is further described in the detailed description which follows, in reference to the noted plurality of drawings by way of non-limiting examples of exemplary embodiment of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. In the following description, portions identical to those which have been previously described are assigned identical reference numerals and a description thereof is omitted where appropriate.

Configuration of System

Figure 1:
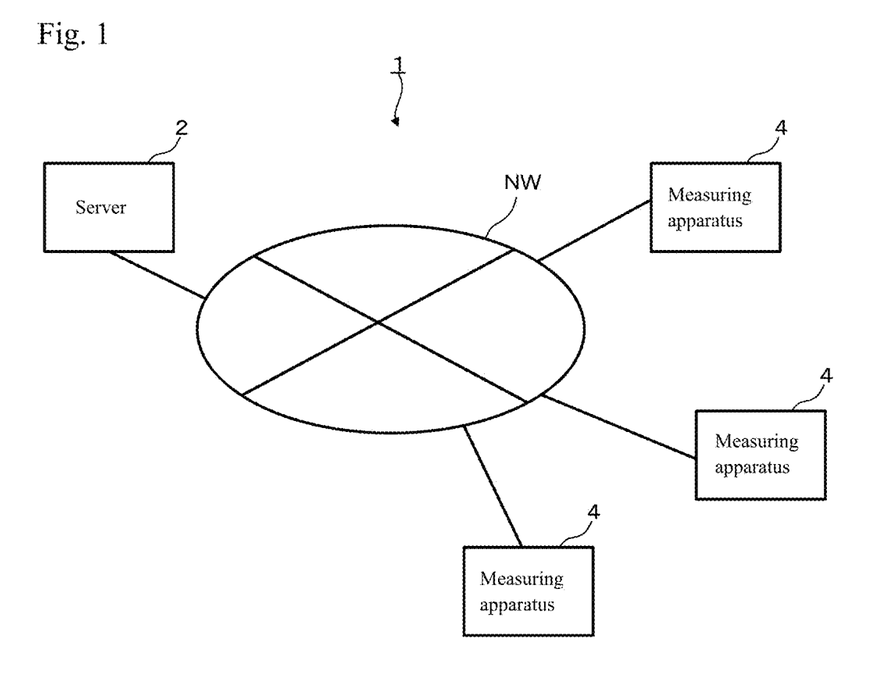
FIG. 1 illustrates an exemplary overall configuration of a measuring apparatus management system.

FIG. 1 illustrates a measuring apparatus management system 1 according to the present embodiment together with a plurality of measuring apparatuses 4 that are managed by the measuring apparatus management system 1. As shown in FIG. 1, the measuring apparatus management system 1 includes a server 2 connected with the measuring apparatuses 4 (management object) via a network NW. In the present embodiment, an example is described where the measuring apparatus 4 managed by the measuring apparatus management system 1 is a roundness measuring apparatus. However, the measuring apparatus 4 may be a measuring apparatus other than the roundness measuring apparatus.

The server 2 is a computer system, for example, and includes an input/output device such as a keyboard, mouse, and touch screen panel; a main body provided with a calculator such as a CPU (Central Processing Unit) and a memory device such as a RAM (Random Access Memory) and ROM (Read Only Memory); a display device such as a CRT (Cathode Ray Tube) or LCD (Liquid Crystal Display); and the like.

Figure 2:
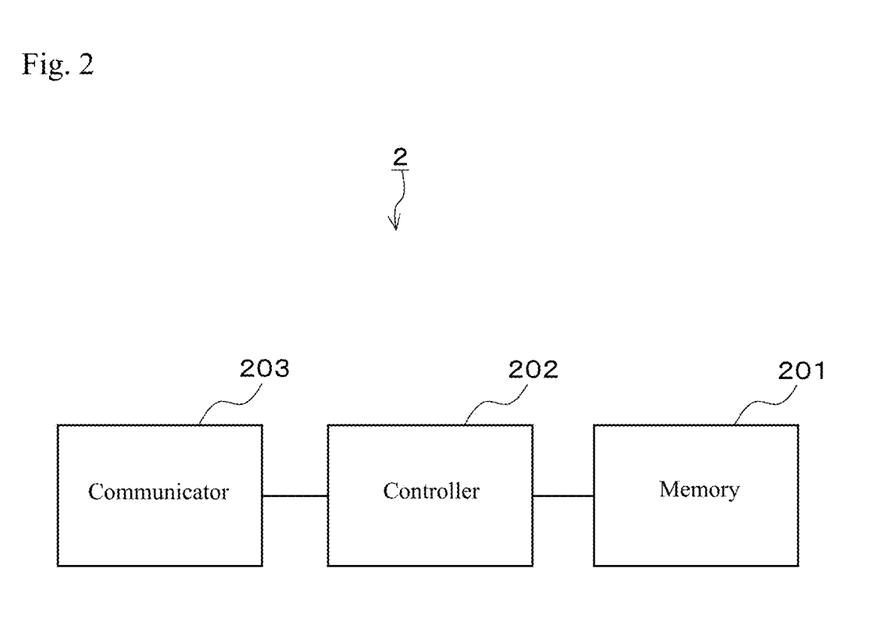
FIG. 2 is a block diagram illustrating a configuration of a server.

As shown in FIG. 2, the server 2 includes at least a memory 201, a controller 202, and a communicator 203. The memory 201 of the server 2 stores programs that are executed by the controller 202 and data used for the programs. For example, the memory 201 stores condition data collected from the measuring apparatus 4, a prediction program that analyzes the condition data and predicts a replacement time of a replacement component, an action program that executes various actions (such as notification of the replacement time, inventory confirmation for the replacement component, and ordering of the replacement component) based on a prediction result from the prediction program.

The controller 202 executes a process according to the program stored in the memory 201. The communicator 203 acts to connect with the network NW to allow communication with the measuring apparatus 4.

Moreover, the server 2 may be configured such that each above-mentioned component is not physically integrated. For example, all or a portion of the above-mentioned components may be dispersedly arranged and may coordinate to act as the server 2.

Configuration of Roundness Measuring Apparatus

Figure 3:
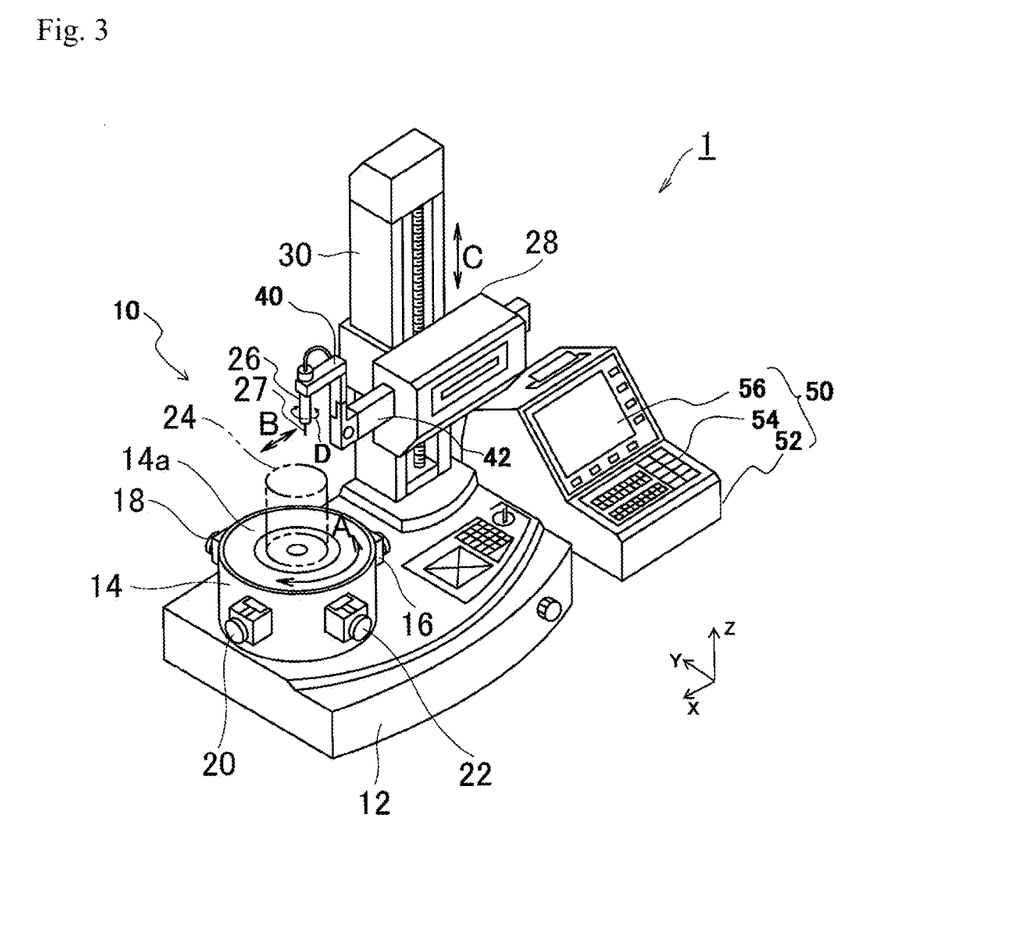
FIG. 3 is an external view of a roundness measuring apparatus that is managed by the measuring apparatus management system.

FIG. 3 is an external view of a roundness measuring apparatus 4 that is managed by the measuring apparatus management system 1. In the same drawing, the roundness measuring apparatus 4 is configured with a roundness measuring apparatus main body 10 as a measurer and a control device 50.

The roundness measuring apparatus main body 10 includes a base 12; a rotary table 14 arranged on the base 12 so as to be able to rotate in an arrow A direction; a position adjuster 16 adjusting an X-direction position and a position adjuster 18 adjusting a Y-direction position of the rotary table 14; an incline adjuster 20 adjusting an inclination in an X direction and an incline adjuster 22 adjusting an inclination amount in a Y direction of a placement surface; a detection device 26 provided with a stylus 27 on a tip end thereof as a stylus head, which can contact and detect a surface position of a measured object 24 placed on the rotary table 14; a detection device holder 40 holding the detection device 26; an arm 42 having the detection device holder 40 mounted to its tip end; a stylus displacer 28 moving the stylus 27 in a horizontal direction by driving the arm 42 in the horizontal (X-axis) direction indicated by an arrow B; and a stylus displacer 30 moving the stylus 27 in a vertical direction by displacing the stylus displacer 28 in the vertical (Z-axis) direction indicated by an arrow C.

In the detection device 26, the stylus 27 is biased by a biaser (not shown in the drawings) such that an axis direction of the stylus 27 is inclined slightly toward the measured object 24 with respect to the Z-axis direction. The detection device 26 brings the stylus 27 into contact with a surface of the measured object 24 and detects a change in position of the stylus 27 when displaced relative to the surface, and thereby obtains measurement data. The measurement data obtained by the detection device 26 is sent to the control device 50 which controls overall operations of the roundness measuring apparatus 4. A polarity of the measurement data detected by the detection device 26 is defined such that, when performing a measurement where the stylus 27 is in contact with an outer circumferential surface of the measured object 24, displacement in a direction where the tip end of the stylus 27 is separated from the measured object 24 is defined as positive.

Figure 4:
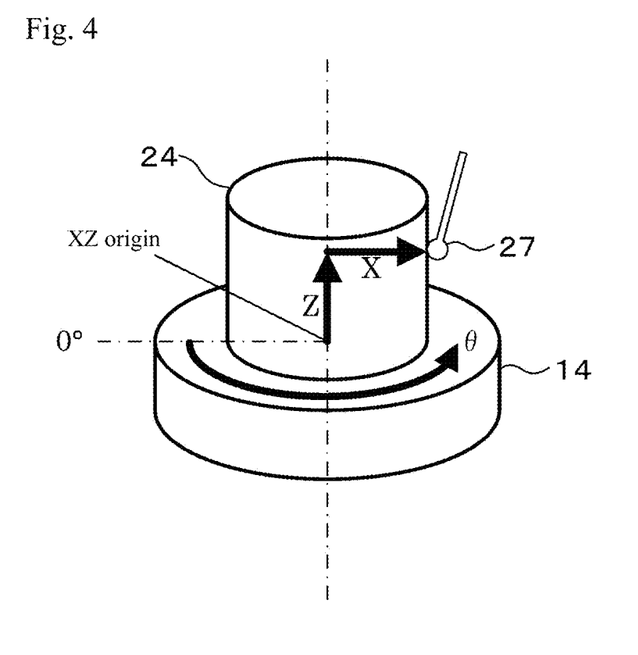
FIG. 4 illustrates a machine coordinate system of the roundness measuring apparatus.

As shown in FIG. 4, the roundness measuring apparatus 4 constructs a machine coordinate system that sets an XZ origin at an intersection point between a top surface of the rotary table 14 and a rotation center axis of the table by performing calibration. Based on the position of the stylus 27 displaced by the stylus displacer 28 and the stylus displacer 30 and the displacement detected by the detection device 26, an X position and a Z position of the tip end of the stylus 27 (referred to as an XZ position) can be obtained.

Figure 5:
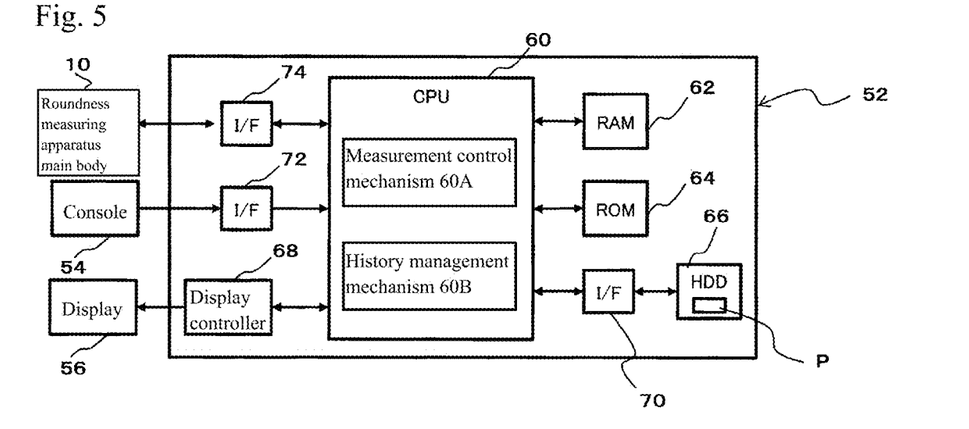
FIG. 5 is a block diagram illustrating a configuration of a control device main body of the roundness measuring apparatus.

The control device 50 is configured with a control device main body 52 that executes various computations and control processes, a console 54, and a display 56. The control device main body 52 mainly includes a CPU 60, a RAM 62, a ROM 64, an HDD 66, and a display controller 68 as shown in FIG. 5. The HDD 66 is connected to the CPU 60 via an interface 70. The console 54 is also connected to the CPU 60 via an interface 72 and code information and position data input from the console 54 is input to the CPU 60 via the interface 72. The CPU 60 is also connected to the display 56 via the display controller 68 and based on a display instruction from the CPU 60, a variety of screens and measurement results are displayed on the display 56 by control of the display controller 68. In addition, the CPU 60 is also connected to the roundness measuring apparatus main body 10 via an interface 74 and a control signal that controls driving of the rotary table 14, stylus displacers 28 and 30, detection device 26, and the like is sent to the roundness measuring apparatus main body 10 via the interface 74 and the measurement data obtained by the detection device 26 is input to the CPU 60. The input measurement data is stored in the HDD 66 via the RAM 62 or the interface 70. The control device 50 analyzes the measurement data and finds a geometric tolerance such as roundness and straightness.

Various programs such as a control program for controlling the roundness measuring apparatus 4 are stored in the RAM 62, the ROM 64, and the HDD 66. In the present embodiment, a function is incorporated in the control program to execute a contact displacement distance accumulation process. In addition, a parts program P is also stored in the HDD 66, the parts program P giving instructions for a series of measurement procedures prepared by a user. In the present embodiment, the CPU 60 retrieves and executes these programs and the parts program P as needed, and serves as a measurement control mechanism 60A that controls the measurement operation of the roundness measuring apparatus 4 and as a history management mechanism 60B managing a use history of the stylus 27.

Further, using numerical control by the control device 50, the parts program P performs the measurement operation and displacement in each axis. A plurality of kinds of measurements are defined in the program and thereby a plurality of geometric tolerances can be found by performing the plurality of kinds of measurements in order. The roundness measuring apparatus 4 can measure geometric tolerances for a roundness of a rotation outer surface, roundness of a rotation inner surface, flatness of a rotation top surface, flatness of a rotation bottom surface, straightness of a linear outer surface, straightness of a linear inner surface, straightness of a linear top surface, straightness of a linear bottom surface, cylindricality of an outer/inner surface of a spiral, and flatness of a top/bottom surface of a spiral, for example.

In other words, when the stylus 27 is displaced by the stylus displacer 28 in the horizontal direction, the stylus 27 comes in contact with an outer circumferential surface of the measured object 24 placed on the rotary table 14. In this state, by rotating the rotary table 14 or displacing the stylus 27 with the stylus displacer 30 in the vertical direction, the detection device 26 can measure the outer circumferential surface of the measured object 24. In the control device 50, when the stylus 27 comes in contact with the outer circumferential surface of the measured object 24 in this way, the roundness (roundness of the rotation outer surface) is found from the measurement data obtained by rotating the rotary table 14 and the straightness (straightness of the linear outer surface) is found from the measurement data obtained by displacing the stylus 27 in the vertical direction.

In addition, by displacing the stylus 27 in the horizontal or vertical directions using the stylus displacers 28 and 30 so as to contact the top surface of the measured object 24, and in this state rotating the rotary table 14 or displacing the stylus 27 with the stylus displacer 28 in the horizontal direction, the detection device 26 can measure the top surface of the measured object 24. In the control device 50, when the stylus 27 comes in contact with the top surface of the measured object 24 in this way, the flatness (flatness of the rotation top surface) is found from the measurement data obtained by rotating the rotary table 14 and the straightness (straightness of the linear top surface) is found from the measurement data obtained by displacing the stylus 27 in the vertical direction.

Furthermore, in the present embodiment, the detection device 26 can rotate through a predetermined angle range (for example, in units of 1 degree between 0 to 270 degrees), the detection device 26 rotating centered on a direction indicated by an arrow D (that is, the Z-axis direction) using a rotation mechanism (not shown in the drawings). Accordingly, the stylus 27 can be brought into contact with an inner circumferential surface of the measured object 24 having a cylindrical shape, and the detection device 26 can measure the inner circumferential surface of the measured object 24 by rotating the rotary table 14 or displacing the stylus 27 with the stylus displacer 30 in the vertical direction. In the control device 50, when the stylus 27 comes in contact with the inner circumferential surface of the measured object 24 in this way, the roundness (roundness of the rotation inner surface) is found from the measurement data obtained by rotating the rotary table 14 and the straightness (straightness of the linear inner surface) is found from the measurement data obtained by displacing the stylus 27 in the vertical direction.

Furthermore, the detection device holder 40 is mounted to the arm 42 so as to be able to rotate by 90 degrees centered on the X-axis, and a posture of the detection device holder 40 can also be changed vertically or horizontally. FIG. 3 shows a state where the posture of the detection device holder 40 is vertical. When the posture of the detection device holder 40 is horizontal and the detection device 26 is rotated, the bottom surface of the measured object 24 (for example, when the measured object 24 is a cylinder or column provided with a large diameter portion having a diameter larger than a bottom end surface at a center portion of the cylinder or column, a surface on the bottom side of the large diameter portion is referred to as the bottom surface) can be brought into contact with the stylus 27, and the detection device 26 can also measure the bottom surface of the measured object 24 by rotating the rotary table 14 or displacing the stylus 27 with the stylus displacer 28 in the horizontal direction. In the control device 50, when the stylus 27 comes in contact with the bottom surface of the measured object 24 in this way, the flatness (flatness of the rotation bottom surface) is found from the measurement data obtained by rotating the rotary table 14 and the straightness (straightness of the linear bottom surface) is found from the measurement data obtained by displacing the stylus 27 in the vertical direction.

In the control device 50, appropriate geometric tolerances are selected and calculated according to types of measured surface (e.g., outer/inner/top/bottom surface) and kinds of displacement (e.g., rotation/straight). Further, measurement with the roundness measuring apparatus 4 is not limited to the geometric tolerances mentioned above and other geometric tolerances and the like may be measured.

Recording History

The roundness measuring apparatus 4 according to the present embodiment performs the various measurements mentioned above and finds the contact displacement distance that accumulates the distance over which the stylus 27 displaces while in contact with the measured object 24, and stores the contact displacement distance in the HDD 66. In the roundness measuring apparatus 4, the contact displacement distance is recorded for each individual stylus 27. Identification of the stylus 27 attached to the detection device 26 may be set by the user. The contact displacement distance is an example of condition data.

Figure 6:
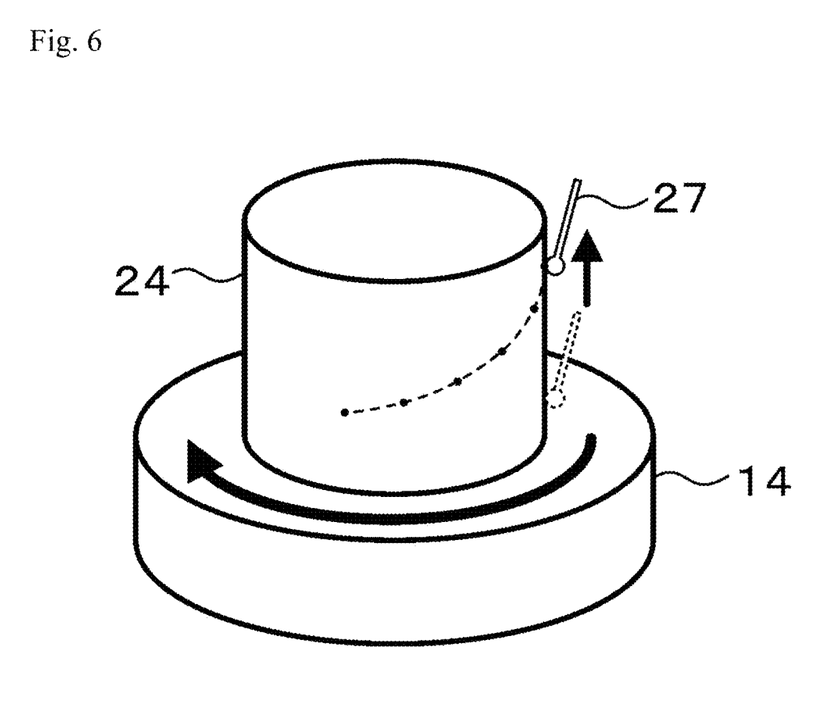
FIG. 6 is a schematic view illustrating a displacement path of a stylus tip end on a measured object.

As shown in FIG. 6, in the roundness measuring apparatus 4, in a state where the tip end of the stylus 27 is in contact with the measured object 24, the rotary table 14 rotates clockwise and the stylus 27 is displaced by the stylus displacer 30 in an upper direction (Z-axis direction). At this time, a path of the stylus 27 when displaced while in contact with the measured object 24 is displayed in a dashed line. An accumulated length of the path over which the stylus 27 is displaced while in contact with the measured object 24 is the contact displacement distance.

The roundness measuring apparatus 4 continues to obtain, at a predetermined cycle, the XZ position of the tip end of the stylus 27 and a rotation angle θ of the rotary table 14 (hereafter, these are collectively referred to as relative position data). In FIG. 6, positions where the relative position data is obtained are indicated by black circles. When the tip end of the stylus 27 is in contact with the measured object 24 both times when two consecutive sets of relative position data are obtained, the contact displacement distance is calculated by accumulating the distance between the positions of the stylus tip end indicated in each of the two sets of relative position data. Further, the shorter the cycle of obtaining the relative position data, the closer the calculated displacement distance is to the actual displacement distance. The measurement cycle may be determined according to required accuracy and may be about a 100 ms cycle, for example.

Figure 7:
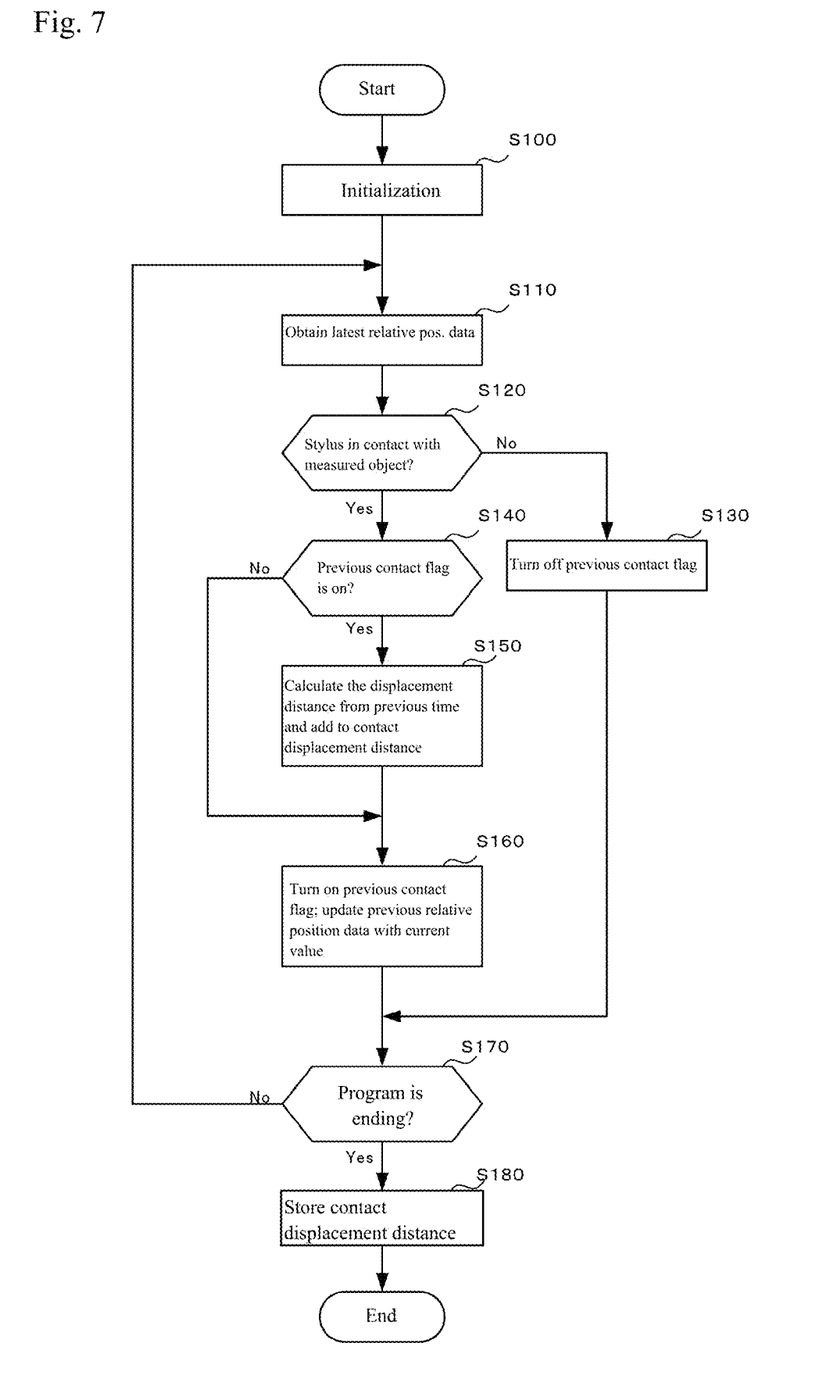
FIG. 7 is a flow chart illustrating a procedure of a contact displacement distance accumulation process.

Next, a procedure of the contact displacement distance accumulation process is described with reference to a flow chart in FIG. 7. The process below is performed by the CPU 60 of the control device 50 running the control program. When no actor is specified for the process, this implies a process in which the CPU 60 of the control device 50 executes the control program. After the roundness measuring apparatus 4 is turned on, when the control program is activated, a function is consequently initiated which executes the contact displacement distance accumulation process incorporated in the control program. Therefore, the contact displacement distance is always monitored and accumulated regardless of whether measurement is performed or not. After the roundness measuring apparatus 4 is turned on, once the control program has been activated, a series of measurements are performed and the stylus 27 is envisioned as repeatedly contacting and separating from the measured object 24 until the control program is ended before the power is turned off. The roundness measuring apparatus 4 according to the present embodiment accumulates, using the following flow, only the displacement distance during the time when the stylus 27 was in contact with the measured object 24 in order to record an accurate contact displacement distance.

When the contact displacement distance accumulation process is started, the control program executed by the CPU 60 initializes various conditions in order to accumulate a newly measured contact displacement distance onto the previously accumulated contact displacement distance. Specifically, the control program retrieves the previously accumulated contact displacement distance from the HDD 66, turns off a previous contact flag that indicates a contact state at the time when the immediately proceeding relative position data was obtained, and defines the relative position data as being in an initial state (for example, the XZ position of the tip end of the stylus 27 and rotation angle θ of the table are both at 0) (step S100). Next, the latest relative position data is obtained (step S110).

Figure 8:
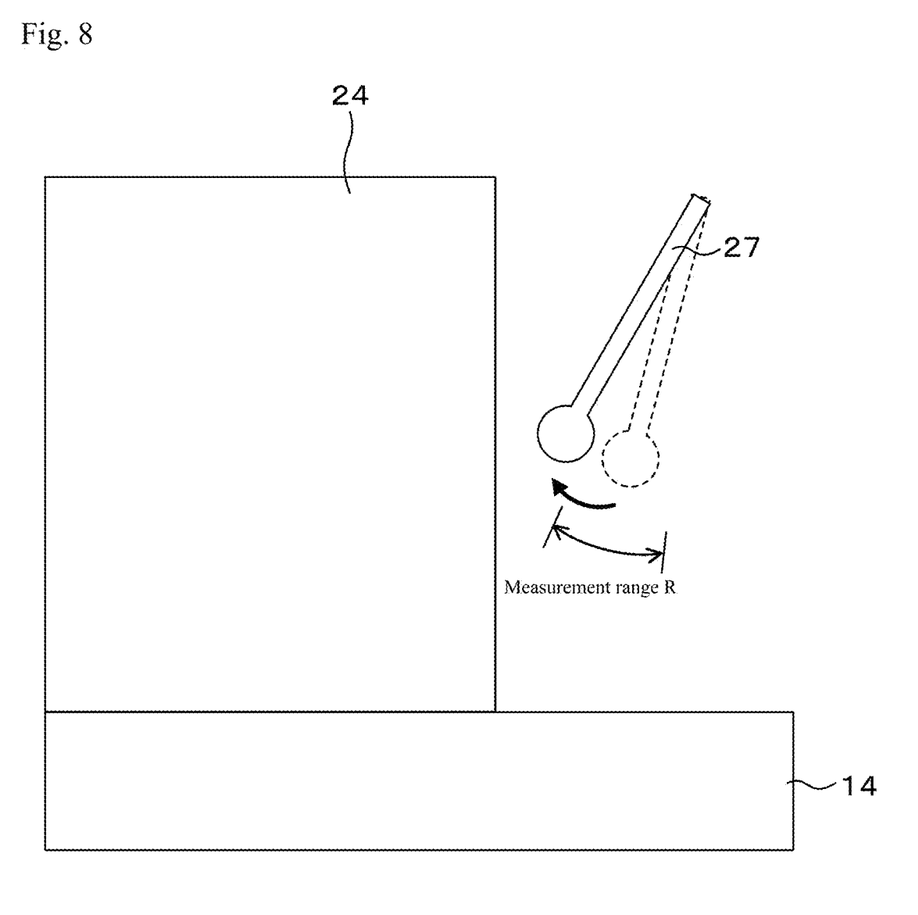
FIG. 8 is a schematic view illustrating an exemplary state in which a stylus is biased.

Next, the control program determines whether or not the stylus 27 is in contact with the measured object 24 (step S120). An exemplary method to determine whether or not contact is made is described below. The stylus 27 attached to the detection device 26 is biased so as to be slightly inclined toward the measured object 24 by a spring and like as noted above. FIG. 8 illustrates an exemplary state in which the stylus 27 is biased during measurement where the stylus 27 is in contact with the outer circumferential surface of the measured object 24. As shown in FIG. 8, when the stylus 27 is not in contact with the measured object 24, a biasing force displaces the tip end of the stylus 27 in a direction where the measured object 24 exists (in the example of FIG. 8, in the left direction and negative direction in the measurement data of the displacement amount). The displacement amount of the stylus 27 is outside of a detection range R (a value that is off the scale in the direction (here, a negative) in which contact is made with the measured object 24, even when a maximum measurement range is selected) for the detection device 26. Thus, when an output value of a displacement detection device that detects the displacement amount of the stylus 27 is a value that is off the scale in the direction in which contact is made with the measured object 24 in the maximum (in other words, magnification power is the lowest) measurement range, the control program determines that the stylus 27 is not in contact with the measured object 24.

FIG. 8 illustrates a case where the measurement was performed by having the stylus 27 in contact with the outer circumferential surface of the measured object 24; however, in a measurement where the stylus 27 is in contact with the inner circumferential surface of the measured object 24, a biasing orientation and a direction that is off the measurement range to determine a non-contact state are appropriately selected. For example, when the inner circumferential surface of the measured object 24 is measured, the biasing orientation and the direction that is off the measurement range to determine the non-contact state are opposite of the example in FIG. 8. In addition, when the top surface and bottom surface of the measured object 24 are measured, in a state where the detection device holder 40 is rotated by 90 degrees, the biasing force is applied to the stylus 27 in a downward or upward direction, and in addition, when the displacement amount is off the scale in the direction in which the biasing force is applied (in other words, the direction where the measured object 24 exists), the stylus 27 may be determined to not be in contact with the measured object 24.

Returning to FIG. 7, when the stylus 27 and the measured object 24 are determined to not be in contact (S120: No), the control program turns off the previous contact flag (step S130) and moves the process to S170. When the previous contact flag is turned off, no contact displacement distance is accumulated regardless of whether the stylus 27 and the measured object 24 are currently in contact. Further, by turning off the previous contact flag when the stylus 27 is not in contact with the measured object 24, no contact displacement distance is accumulated even when the stylus 27 was in contact with the measured object 24 at the time when the next relative position data was to be obtained.

On the other hand, when the stylus 27 and the measured object 24 are determined to be in contact (S120: Yes), the control program determines whether or not the previous contact flag is turned on (step S140). When the previous contact flag is not turned on (the flag is turned off) (S140: No), the control program moves the process to step S160. That is, even when the stylus 27 is in contact with the measured object 24 at the present time, no contact displacement distance is accumulated when there is no previous contact.

On the other hand, when the contact flag is turned on (S140: Yes), the control program calculates the displacement distance from the present and previous relative position data, adds the displacement distance to the contact displacement distance (step S150), then moves the process to step S160. Moreover, a locus traced by the tip end of the stylus 27 displacing on the surface of the measured object 24 while measuring the present and previous relative position data will be one of a straight line, arc, or circular arc as illustrated in Table 1 depending on which of the stylus displacers 28 and 30 and the rotary table 14 has moved.

TABLE 1

| Stylus displacer 28 | ○ | ○ | ○ | X | ○ | X | X |
|---|---|---|---|---|---|---|---|
| Stylus displacer 30 | ○ | ○ | X | ○ | X | ○ | X |
| Rotary table 14 | ○ | X | ○ | ○ | X | X | ○ |
| Locus | Arc | Straight line | Arc | Arc | Straight line | Straight line | Circular arc |

○: Displacement
X: No displacement

In step S150, the control program calculates the displacement distance based on the previous and present relative position data and which one of the stylus displacers 28 and 30 and the rotary table 14 has moved.

In step S160, the control program turns on the previous contact flag, and in addition, updates the previous stylus tip end position and the previous table angle with current values (step S160). In step S160, in a loop where steps S110 to S170 are repeatedly executed, the control program updates data in preparation for the next process. Then, the control program determines whether or not the control program has begun an end process (step S170). When the control program has begun the end process (step S170: Yes), the control program stores the latest contact displacement distance in the HDD 66 (step S180) and ends the process. On the other hand, when the control program has not begun the end process (step S170: No), the control program returns the process to step S110 and continues the process. Moreover, even at times other than step S180, the control program may at any time (for example, every time step S150 is executed) store in the HDD 66 the accumulated displacement distance.

As noted above, the roundness measuring apparatus 4 can calculate and record the contact displacement distance accumulating the distance over which the stylus 27 displaces while in contact with the measured object 24.

Use of Contact Displacement Distance

Figure 9:
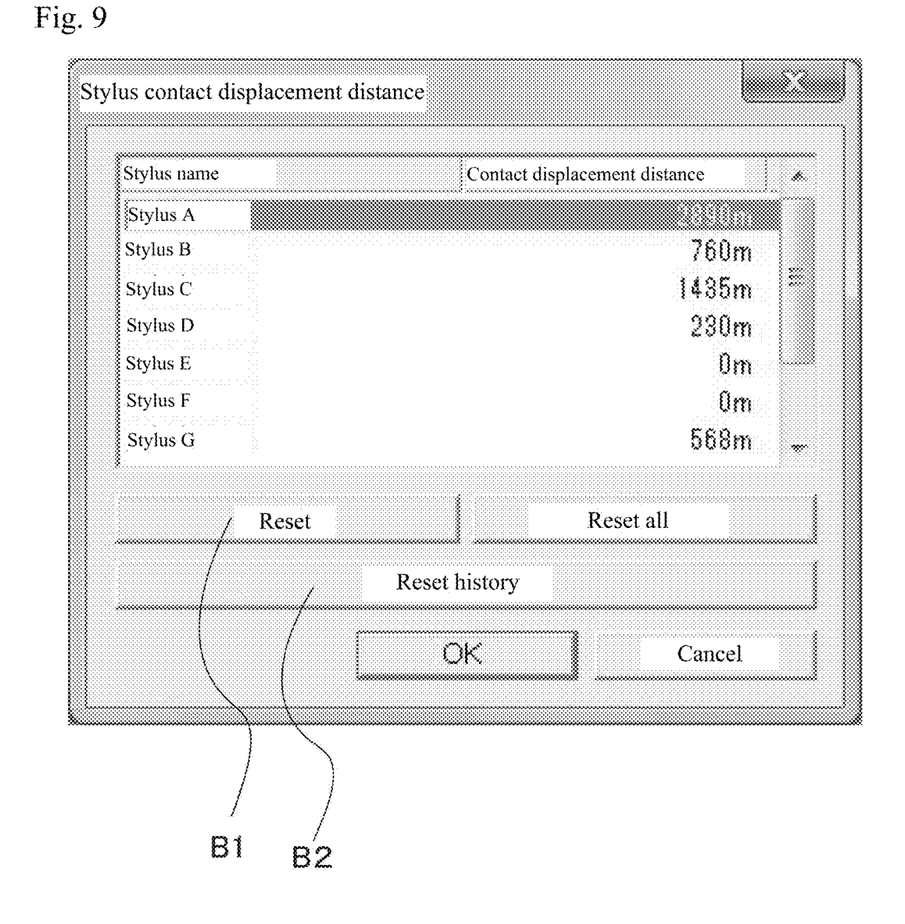
FIG. 9 illustrates an exemplary notification screen.
Figure 10:
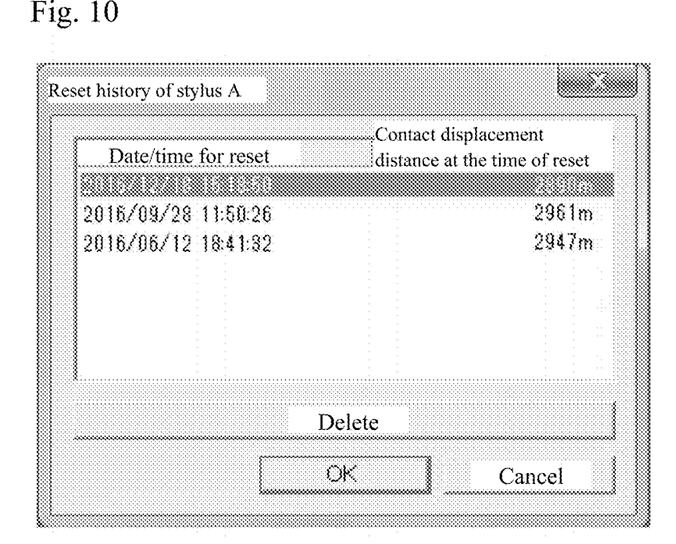
FIG. 10 illustrates an exemplary display screen of a reset history.

The recorded contact displacement distance is displayed on the display 56 automatically or based on the user's operation. For example, when the user selects a contact displacement distance display menu in an operation program of the roundness measuring apparatus 4, a notification screen as shown in FIG. 9 is displayed. In other words, the stylus 27 and the contact displacement distance of the stylus 27 are associated and displayed in the notification screen. In this way, the user can refer to the use history of each stylus 27 at a desired time and estimate a degree of deterioration due to wear. In addition, a threshold value is provided for each stylus 27 and a screen shown in FIG. 9 may be displayed automatically when the contact displacement distance reaches the corresponding threshold value. In this way, it is possible to prompt the user to replace the stylus 27 at a time when the stylus 27 should be replaced. The notification screen may be displayed in a state where the currently attached stylus 27 is selected. When the stylus 27 is replaced or the like, the contact displacement distance may be reset to 0 by pushing a reset button B1 of the notification screen. In the roundness measuring apparatus 4, the contact displacement distance and date/time when the reset is performed may be recorded each time a reset operation is performed. When a reset history display button B2 is pushed in the notification screen, the date/time of past resets and the contact displacement distance at the time of the reset may be associated and displayed for the selected stylus 27 using a reset history display screen as shown in FIG. 10. In this way, the user can know the reset history, and further, can estimate the deterioration status of the stylus 27 that has been used in past measurements.

In the measuring apparatus management system 1, the server 2 collects the contact displacement distance from a plurality of measuring apparatuses (roundness measuring apparatuses) 4, and manages the apparatuses. The server 2 analyzes the contact displacement distance collected from the various measuring apparatuses and predicts the time to replace each individual stylus 27. Further, the server 2 may send a notification to a production department of information related to the required time and quantity for the stylus based on the predicted replacement time for the stylus 27. Furthermore, the server 2 may refer to a stock management system (not shown in the drawings) for the stylus that is connected via the network NW, and may send a notification to the production department of information related to a production plan for the stylus according to the stock of the stylus. For example, when the stylus 27 is predicted to be out of stock around the time for replacement, in order to increase the availability at the time of replacement, a notification may be sent to suggest increasing production of the stylus and the like. In this way, by managing the measurement history information of various measuring apparatuses together, it is possible to predict the time to provide consumables and reduce lead time prior to replacement while suppressing a stock amount.

In addition, by limiting the data collected by the server 2 to information related to the condition of the measuring apparatus, it is possible to reduce labor and cost associated with security management of the user's customer information and confidential measurement data, and further enables reduction in the amount of data to be communicated and recorded.

Modifications

An embodiment is described above. However, the present invention is not limited to this example. For example, in the embodiment described above, an example is described in which a roundness measuring apparatus is used as a measuring apparatus, however, other measuring apparatuses may be used. For example, a surface texture measuring apparatus that performs measurement using a stylus similar to the roundness measuring apparatus, and a probe microscope (such as a scanning tunnel microscope or atomic force microscope) that performs measurement by displacing a probe along a surface of a measured object may also be used. In addition, any measuring apparatus may be used as long as the measuring apparatus requires replacement of a component and maintenance. Examples of the component that requires maintenance and replacement may include light-emitting components such as a laser, LED, and tubular bulb; movable components that generates wear due to sliding; components that deteriorate due to chemical change; components that deteriorate due to physical external forces such as impact; and the like. Any measuring apparatus may be used to record condition data reflecting the degree of deterioration of components that require maintenance and replacement, and in addition, may collect the condition data with a server and perform a process based on the condition data collected by the server.

Further, in the embodiment noted above, an example is described in which the server is configured integrally, however, the server may be configured to carry out the noted functions through the coordination of a plurality of physically separated devices.

Furthermore, in the embodiment noted above, an example is described in which the control program for controlling the roundness measuring apparatus 4 is configured to incorporate a function to execute the contact displacement distance accumulation process, however, the function to execute the contact displacement distance accumulation process may be stored in the RAM 62, the ROM 64, or the HDD 66 as a program different from the control program and be executed by the CPU 60.

Moreover, in the embodiment noted above, the stylus 27 attached to the detection device 26 is identified based on the user's input, however, identification information to identify the stylus 27 may be configured such that the attached stylus 27 is identified automatically by affixing visually, optically, or magnetically readable data to the individual stylus 27, and reading the identification information with the roundness measuring apparatus 4.

With respect to the above-described embodiment, a person skilled in the art can make additions, deletions, and design modifications of configuration elements as appropriate, and can combine features of the embodiment as appropriate, and such modifications are also included in the scope of the present invention as long as they fall within the subject matter of the present invention.

It is noted that the foregoing examples have been provided merely for the purpose of explanation and are in no way to be construed as limiting of the present invention. While the present invention has been described with reference to exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measuring apparatus management system comprising:
   a controller; and
   a memory that stores an instruction, the measuring apparatus management system further comprising, as a configuration when the controller executes the instruction stored in the memory:
   an acquirer that acquires condition information indicating a status of a replacement component in each of a plurality of measuring apparatuses, wherein the condition information is a contact displacement distance over which the replacement component cumulatively displaces while in contact with a surface of a measurable object; and
   a predictor that predicts a replacement time of the replacement component based on the condition information obtained by the acquirer.

2. The measuring apparatus management system according to claim 1, further comprising:
   a server operably connected to the controller and the memory, the server comprising a communicator configured to notify a production department of information on a required time and quantity for the replacement component, based on a prediction result from the predictor.

3. The measuring apparatus management system according to claim 2, wherein the server is further configured to notify the production department of information related to a production plan for the replacement component based on the prediction result from the predictor and an inventory of the replacement component.

4. The measuring apparatus management system according to claim 3, wherein the condition information is not measurement data in the measuring apparatus.

5. The measuring apparatus management system according to claim 2, wherein the condition information is not measurement data in the measuring apparatus.

6. The measuring apparatus management system according to claim 1, wherein the condition information is not measurement data in the measuring apparatus.

7. The measuring apparatus management system according to claim 1, wherein the measuring apparatus is a roundness measuring apparatus and the replacement component is a stylus.

8. The measuring apparatus management system according to claim 1, wherein the server is further configured to notify the production department of information related to a production plan for the replacement component based on the prediction result from the predictor and an inventory of the replacement component.

9. The measuring apparatus management system according to claim 1, wherein the contact displacement distance is monitored and accumulated regardless of whether or not measurement is performed.

10. At least one tangible, non-transitory computer-readable medium storing an executable set of instructions for controlling a measuring apparatus management system, wherein the set of instructions, when executed by a computer processor, causes the computer processor to execute operations comprising:
    acquiring condition information indicating a status of a replacement component in each of a plurality of measuring apparatuses, wherein the condition information is a contact displacement distance over which the replacement component cumulatively displaces while in contact with a surface of a measurable object; and
    predicting a replacement time of the replacement component based on the condition information obtained by the acquiring.

11. The computer-readable medium according to claim 10, wherein the set of instructions, when executed by the computer processor, causes the computer processor to execute operations further comprising:
    notifying a production department of information on a required time and quantity for the replacement component, based on the predicting.

12. The computer-readable medium according to claim 11, wherein the notifying further comprises notifying the production department of information related to a production plan for the replacement component based on the predicting and an inventory of the replacement component.

13. The computer-readable medium according to claim 12, wherein the condition information is not measurement data in the measuring apparatus.

14. The computer-readable medium according to claim 11, wherein the condition information is not measurement data in the measuring apparatus.

15. The computer-readable medium according to claim 10, wherein the condition information is not measurement data in the measuring apparatus.

16. The computer-readable medium according to claim 10, wherein the measuring apparatus is a roundness measuring apparatus and the replacement component is a stylus.

17. The computer-readable medium according to claim 10, wherein the contact displacement distance is monitored and accumulated regardless of whether or not measurement is performed.

* * * * *